United States Patent
Liu

(10) Patent No.: US 6,381,063 B1
(45) Date of Patent: Apr. 30, 2002

(54) LONG BAND OPTICAL AMPLIFIER

(75) Inventor: Yongqian Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/526,892

(22) Filed: Mar. 16, 2000

(51) Int. Cl.$^7$ .............................. G02B 6/26; H01S 3/13
(52) U.S. Cl. ................... 359/337; 359/134; 359/341.3; 372/6
(58) Field of Search ........................ 359/337, 341, 359/134, 160, 341.3; 372/6, 40

(56) References Cited

U.S. PATENT DOCUMENTS

| | | | | |
|---|---|---|---|---|
| 5,185,826 A | * | 2/1993 | Delavaux ..................... | 385/24 |
| 5,260,816 A | * | 11/1993 | Edagawa et al. ........... | 359/341 |
| 5,295,217 A | * | 3/1994 | Marcerou et al. ........... | 385/122 |
| 5,430,572 A | * | 7/1995 | DiGiovanni et al. ......... | 359/341 |
| 5,731,892 A | * | 3/1998 | DiGiovanni et al. ......... | 359/341 |
| 5,852,510 A | * | 12/1998 | Meli et al. .................. | 359/341 |

OTHER PUBLICATIONS

Espindola, R.P. et al., *Low noise, high gain, high conversion efficiency L–band EDFA*, Technical Digest of the 10$^{th}$ Optical Amplifier and Their Application, Nara, Japan (1999).

Nillson et al, IEEE Photonics Technology Letters, vol. 10, #11, pp. 1551–1553; 12/98.*

Tanaka et al, Optical Society of America, vol. 13, ThD4–1–4; 7/91.*

Takano et al, Proceedings of 1995 IEICE Gen. Conf., B–1067, p. 513, 3/95.*

* cited by examiner

*Primary Examiner*—Nelson Moskowitz
(74) *Attorney, Agent, or Firm*—Svetlana Z Short

(57) ABSTRACT

An optical amplifier comprises: a first gain medium having an optical host that contains a rare earth dopant and a first pump that supplies optical energy at a first wavelength into this first gain medium. The first gain medium is an optical fiber of a predetermined length, such that inversion of this first gain medium is not saturated. The optical amplifier further comprises a second gain medium operatively coupled to the first gain medium and a second pump that supplies optical energy into the second gain medium. According to an embodiment of the present invention the predetermined length of the optical fiber of the first gain medium is 1 to 6 meters and preferably 1.5 to 4.5 meters.

22 Claims, 10 Drawing Sheets

LONG BAND OPTICAL AMPLIFIER

CROSS-REFERENCED TO A RELATED APPLICATION

Reference is made commonly assigned patent application Ser. No. 09/472459 filed on Dec. 27, 1999, filed in the name of Flood et al. and entitled "LONG BAND OPTICAL AMPLIFIER".

FIELD OF THE INVENTION

The present invention relates generally to Long Band Optical Amplifiers with low noise figure. This invention is particularly suitable for use in long band optical amplifiers utilizing a rare earth doped fiber and at least one 1480 nm pump.

BACKGROUND OF THE INVENTION

Optical amplifiers increase the amplitude of an optical wave through a process known as stimulated emission. During this process a pump photon, supplied by an optical pump, excites an electron to a higher energy level within an optical material. When a signal photon interacts with the excited electron, the electron undergoes a transition to a lower energy level. In the process, the material emits a coherent photon with the same frequency, direction and polarization as the initial signal photon. The two photons can, in turn, serve to stimulate the emission of two additional photons coherently, and so forth. The result is coherent light amplification. Stimulated emission occurs when the photon energy is nearly equal to the atomic transition energy difference. For this reason, the process produces amplification in one or more bands of frequencies determined by the atomic line width.

While there are a number of different optical amplifier configurations in use today, optical fiber amplifiers are quite popular, particularly for optical communications applications. The optical fiber amplifier typically includes an optical material such as glass, combined with a rare earth dopant such as such as Erbium and configured as an optical waveguide. Rare-earth-doped silica fibers are popular today in part because they offer the advantages of single-mode guided wave optics. Optical fiber amplifiers made of such fibers can be made to operate over a broad range of wavelengths, dictated by the atomic properties of the host and rare earth dopant. For example, Erbium doped fiber amplifiers (EDFAs) operate at two signal bands of the fiber transmission window. These signal bands are a conventional-band (C-band) with wavelength range from approximately 1528 nm to approximately 1565 nm and a long band (L-band) with wavelength range from approximately 1568 nm up to approximately 1620 nm.

In a typical optical amplifier fabricated using Erbium doped silica fiber, electrons are excited (pumped) from the ground state ($^4I_{15/2}$) to the metastable state ($I_{13/2}$) by a pump at either 980 nm wavelength or 1480 nm wavelength. In the case of 980 nm pump, the electrons are first pumped to an excited state ($^4I_{11/2}$) and then non-radiatively decay into the metastable state ($^4I_{13/2}$) (See FIG. 1). In the case of 1480 nm pump the electrons are directly pumped into $^4I_{13/2}$ state. The amplification occurs when the electrons in $I_{13/2}$ state decay into the ground state by stimulated emission. After the electrons decay to the ground energy level $^4I_{15/2}$, they can be re-pumped to the excited energy level $^4I_{11/12}$ where they can take part in further stimulated emission processes.

Erbium doped fiber amplifiers (EDFAs) are typically made out of multiple stages of coiled Er-doped fibers. An example of such an Erbium doped fiber amplifier is shown in FIG. 2. The most critical parameters on the performance of EDFAs are noise figure (NF) and gain G. The noise figure, NF, measured in dBs is defined as 10times $Log_{10}$ of the ratio of the signal (S) to noise (N) ratio at the input of the amplifier to that at the output of the amplifier. That is, NF=10×$Log_{10}$[(S/N) in/ (S/N) out]. The gain, G, is defined as the ratio of signal output power to signal input power. In multistage amplifiers the noise figure NF is largely determined by the gain G in the front end of the amplifier. Thus, the higher the gain G of the first coil of the EDFA, the lower NF. Another measure of EDFA performance is the power efficiency, which is defined as the ratio between the number of signal photons amplified and emitted to the number of pump photons. Since the performance of the communication system is determined by the noise performance of the amplifiers in the system, signal power of the amplifiers, and fiber transmission properties, optical communication systems require that the EDFAs have the lowest possible noise figure (NF), and provide the highest possible gain, (G).

FIG. 3A illustrates the absorption spectrum of the Erbium doped fiber (EDF). This figure shows that a strong absorption peak is present in the 980 nm-pumping band. Because of the strong absorption at the 980 nm wavelength, some long-band EDFAs use a 980 nm pump in conjunction with a first EDF coil. The use of the 980 nm wavelength pump introduces high inversion at the front end of the optical amplifier, thus resulting in a relatively low noise figure. (See FIG. 2.) The 980 nm pump provides less efficient power conversion relative to 1480 nm pump and is relatively difficult to build. Therefore, a 980 nm pump is expensive. However, it is a common belief that the use of a less efficient, more expensive 980 nm pump (as the first pump in the L-band amplifier) is needed in order to provide low noise and thus, high signal to noise ratio so that a cleaner signal is provided to the second EDF coil for further amplification.

The major degradation to NF in L-band EDFAs comes from BASE (backward amplified spontaneous emission). The BASE accumulates over long fiber length and is due to high inversion at the front end of the optical amplifier. The strong BASE saturates the front end inversion, thus reducing the gain at the front end and increasing the NF of the amplifier. It is known that a spectral filter can be used to block BASE in the 1528 to 1565 nm wavelength range resulting in NF improvement of about 0.5 dB. However, the spectral filter is complex and relatively difficult to manufacture, which makes it expensive. In addition, the spectral filter does not function as an ideal step function and affects the transmission T in the signal band, for example, through the oscillatory ripple. (See FIG. 3B) This will introduce loss in the gain spectrum, known as gain ripple, of about 0.3 dB. Finally, spectral filters introduce a relatively large insertion loss, which often is about 0.6 dB.

In order to extract maximum power, the rear stage pump (i.e., the pump that is coupled to the second EDF coil) is typically a more efficient, less expensive to manufacture, 1480 nm wavelength pump (see FIG. 2). It is known that this second pump will improve the efficiency of the multiple stage EDF amplifier without introducing too much noise into the system.

It is desirable to provide low noise L-band optical amplifiers that are also more efficient than prior art long band optical amplifiers.

SUMMARY OF THE INVENTION

According to one aspect of the present invention an optical amplifier comprises: a first gain medium having an optical host that contains a rare earth dopant and a first pump that supplies optical energy at a first wavelength into this first gain medium. The first gain medium is an optical fiber of a predetermined length, such that inversion of this first gain medium is not saturated. The optical amplifier further comprises a second gain medium operatively coupled to the first gain medium and a second pump that supplies optical energy into the second gain medium.

According to an embodiment of the present invention the predetermined length of the optical fiber of the first gain medium is 1 to 6 meters and preferably 1.5 to 4.5 meters.

More specifically, according to one embodiment of the present invention a optical amplifier includes:

(i) a first gain medium having an optical host that contains a rare earth dopant, the first gain medium being an Er doped optical fiber having a length of less than 10 meters, (ii) a 1480 nm first pump that supplies optical energy at a first wavelength into the first gain medium;

(iii) a second gain medium operatively coupled to the first gain medium, the second gain medium being an Er doped optical fiber having a length of greater than 10 meters; and (iv) a second pump supplying optical energy into the second gain medium.

Embodiments of the present invention can provide an optical amplifier and a pumping technique that overcomes the difficulties associated with prior art L-band optical amplifiers. It is an advantage of this optical amplifier that it has low noise and high pumping efficiency.

For a more complete understanding of the invention, its objects and advantages, refer to the following specification and to the accompanying drawings. Additional features and advantages of the invention are set forth in the detailed description, which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

We have discovered that an improved dual pumping technique, (described in detail below) overcomes difficulty associated with prior art, and that the optical amplifier utilizing this dual pumping technique exhibits very low noise level and has approximately 40% higher efficiency than the prior art optical amplifiers. According to an embodiment of the present invention, this technique utilizes two pumps operating at the same wavelength. According to one embodiment of the invention, both pumps operate at a wavelength of 1480 nm and the optical amplifier utilizes multiple coils (stages) of Erbium doped fiber.

Figure 1:
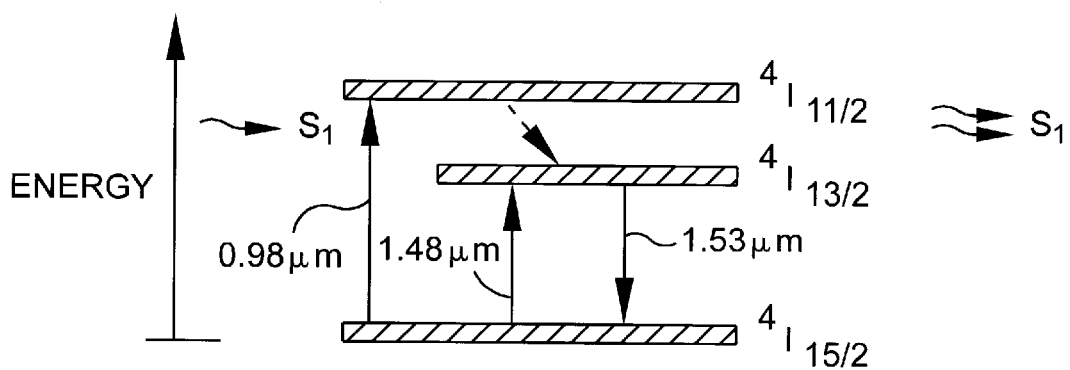
FIG. 1 is an energy diagram for an Erbium doped silica glass.
Figure 2:
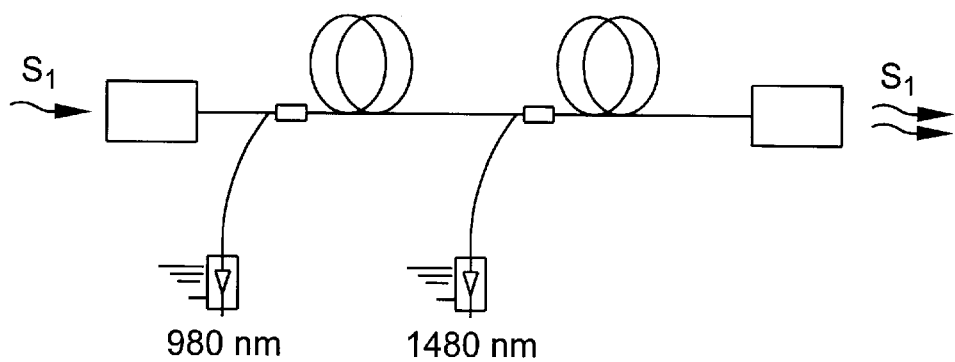
FIG. 2 is a schematic diagram illustrating a prior art two stage pumped optical fiber amplifier.
Figure 3A:
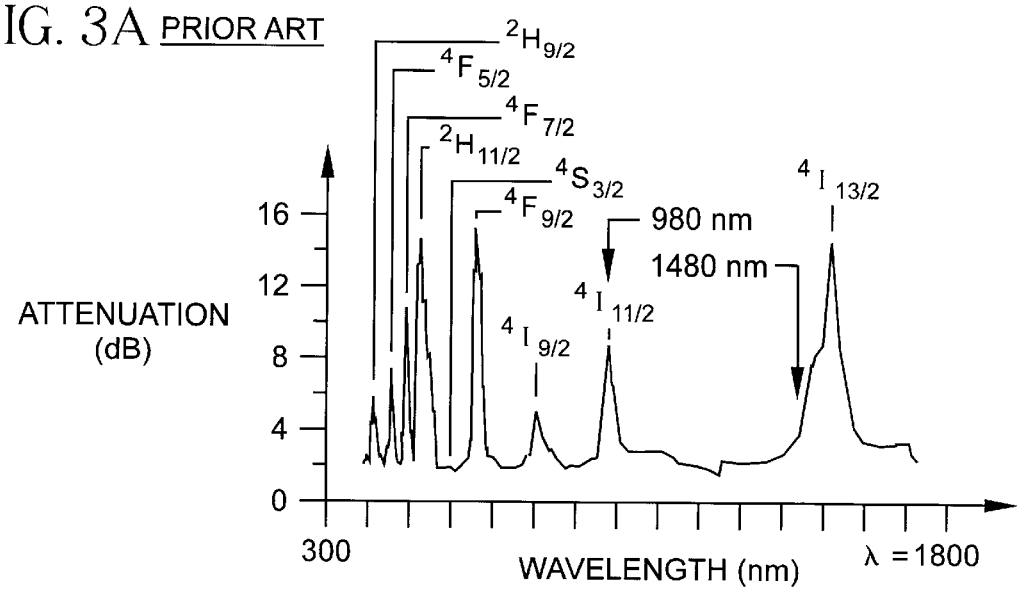
FIG. 3A is a plot of the absorption spectrum of the Erbium doped fiber.
Figure 3B:
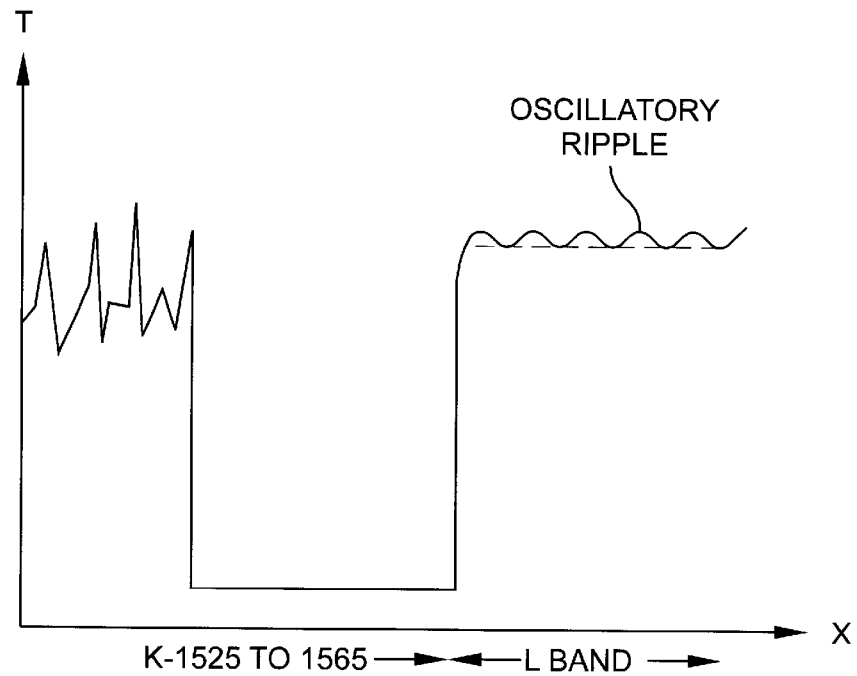
FIG. 3B is a plot of transmission T versus wavelength for a typical spectral filter.
Figure 4:
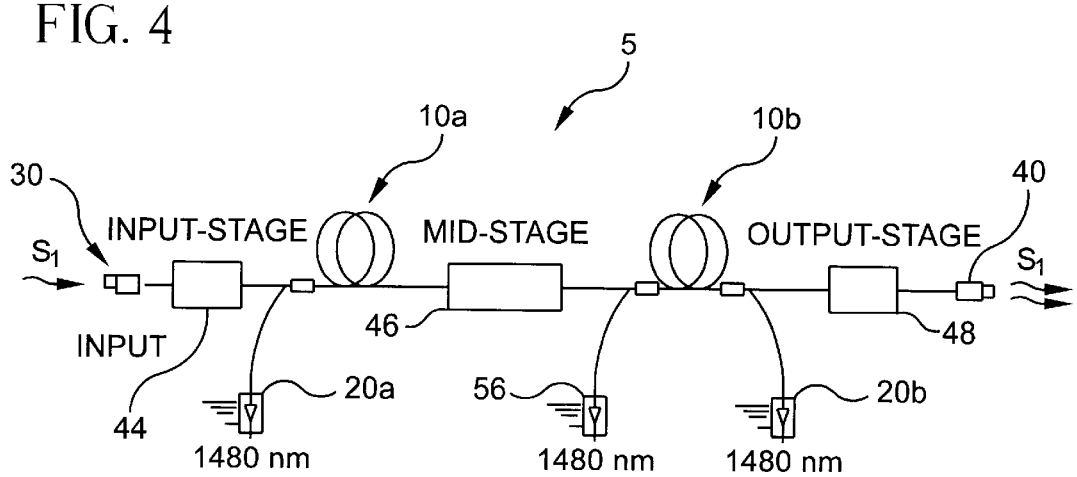
FIG. 4 is a schematic diagram a first exemplary two stage optical amplifier.

FIG. 4 illustrates an exemplary optical amplifier 5. This optical amplifier utilizes two optical waveguides 10a and 10b which may be, for example, an active optical fiber having an inner core of a first optical material and an outer cladding of a different material. The materials used for the inner core and outer cladding have different indices of refraction so that the light propagates in a confined manner through the waveguide.

As will be more fully explained below, the optical waveguide comprises a host material, preferably of glass, that contains a rare earth dopant. A variety of different optical materials and rare earth dopants may be used for this purpose. Although Erbium dopped silica fiber is used as an example in this embodiment, the use of other example materials will be apparent to those having skill in the art. The optical amplifier 5 has a first pump 20a that serves as the primary pump. This pump is used to excite a population of rare earth ions within the optical material, raising them from their ground energy state to a metastable energy state. The metastable energy state is characterized by a comparatively long fluorescence lifetime, usually greater than 10 microseconds. In other words, ions raised to the metastable energy state remain in that state for a sufficient time enabling stimulated emission. The optical amplifier 5 illustrated in FIG. 4 includes an input port 30 into which an optical input signal S1 may be introduced. The input port 30 couples the input optical signal S1 into the first optical waveguide 10a (comprising a coiled active fiber) whereby amplification is produced by stimulated emission of photons from the metastable energy state. A second optical waveguide 10b, also comprising a coiled active fiber is arranged downstream of the first optical waveguide 10a. The optical waveguide 10b further amplifies optical signal provided by the waveguide 10a. The second optical waveguide 10b is coupled to the output port 40, from which the amplified optical signal exits the amplifier 5. The second pump 20b is coupled to the second optical waveguide 10b and serves to excite the population of rare earth atoms in the optical material of the waveguide 10b by raising them to the metastable energy state. The amplified optical signal exiting the first waveguide, 10a, is used as an input signal for the waveguide 10b and, as stated above, is further amplified by this waveguide, 10b. The amplifier 5 may include an input stage 44, a mid stage 46 and an output stage 48. These stages may include components such as coupler(s), wavelength division (de)multiplexer(s), dispersion compensator(s), filter(s), isolator(s), attenuator(s) such as variable optical attenuator (s), and/or gain flattener(s), for example.

We have compared the performances of two stage Erbium doped silica fiber amplifiers (similar to the one of FIG. 4) with different first stage pumps 20a, each having to provide one of three different pump wavelengths. The pump power of the first stage pumps 10a is 140 mW. In each of these amplifiers, the second waveguide 10b is pumped by two 1480 nm pumps 20b to achieve good power conversion (i.e. high efficiencies). The pump power for the pumps 20b was varied between 130 mW and 185 mW. The total fiber length, i.e. the length of coiled fibers for both the first and second stages (corresponding to waveguides 10a and 10b), was approximately 130 meters. The length of the coiled fiber of the waveguide 10a was over 12 meters. The results obtained from the simulated modeling of the amplifiers and from the actual measurements are discussed below. The analysis compares amplifiers that utilize a first pump 20a that provides either a 980 nm (case I), 1480 nm (case II) or 1510 nm (case III) pumping wavelength. The performance metrics are amplifier noise figure (NF) and second stage pump power (i.e. the pump power of the pump 20b).

Figure 5:
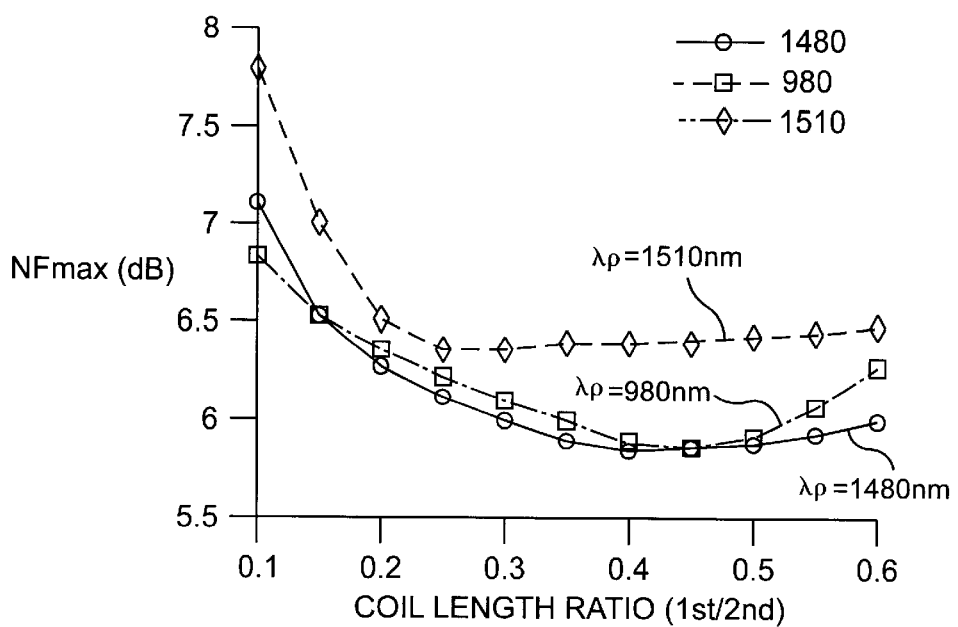
FIG. 5 is a family of curves representing noise figure (NF) as a function of coil length ratio, illustrating the resultant effect of varying the pump wavelength on NF.

FIG. 5 shows the maximum NF (noise figure) as a function of coil length ratio between the first stage (waveguide 10a) and second stage (waveguide 10b) for the three amplifier simulation models. It is clear from the simulation results that the maximum NF produced when the pump 20a operates at either 1480 nm or 980 nm wavelength is about the same. However, as can be seen from this figure, pumping with the 1510 nm pump 20a results in a significant degradation of NF. Pumping at different wavelengths on the first stage of the optical amplifier results in different front-end inversions due to the differences in absorption and emission coefficients at the pump wavelength of the pump 20a. For L-band amplifier, the front-end inversions for 980 nm and 1480 nm pumping are approximately the same due to a higher BASE (backward amplifier spontaneous emission) saturation in the 980 nm case.

Figure 6:
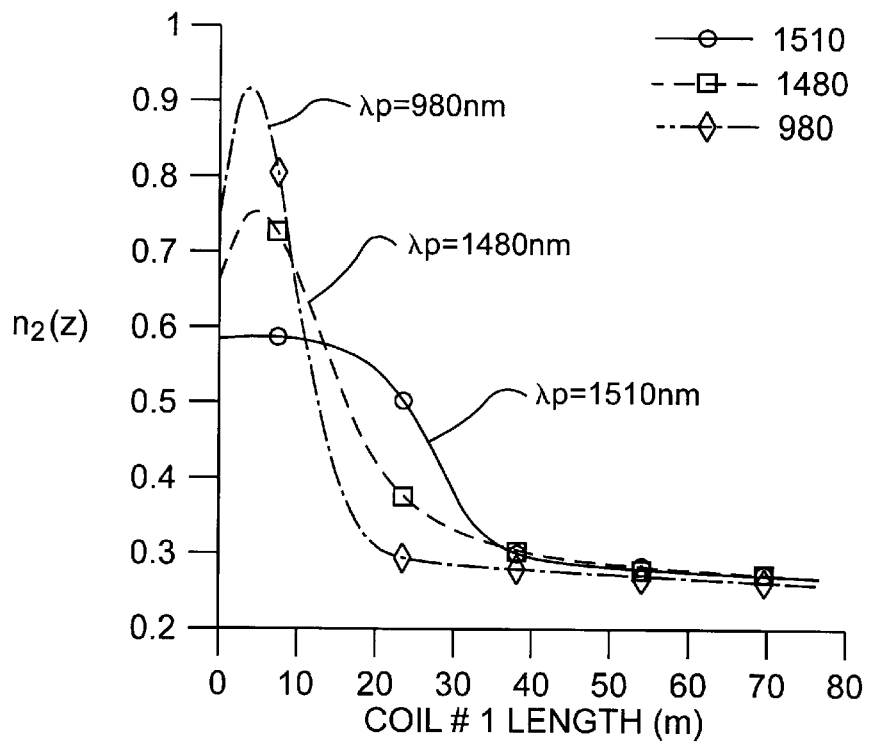
FIG. 6 illustrates the inversion profile of the first coil or EDFA for three different pumps.

FIG. 6 shows the inversion profile along the first coil of the Er-doped fiber using different forward pumping pumps 20a that operate at the same power (140 mW) but at different wavelengths. These wavelengths are 980 nm, 1480 nm, and 1510 nm. As stated above, the higher inversion at the front end of the optical amplifier results in lower noise figure. There is a clear saturation of the inversion at the front end of the amplifier when the 980 nm pump is being used. This is the result of strong ASE from the accumulation of the BASE at the front end of the optical amplifier. As can be seen from this figure, the inversion saturation corresponding to the 1480 nm pump is significantly lower than that of a 980 nm pump, while the inversion profile corresponding to the 1510 nm pump shows no saturation of the front end inversion. Thus, we discovered that in the L-band amplifiers, the 1480 nm pump 20a has lower BASE than the 980 nm pump, and because of this, the front end inversion of the 1480 nm and 980 nm pumps is about the same. Therefore, surprisingly, these two pumps 20a (1480 nm and 980 nm) provide about the same noise figure NF. However, the 1480 nm pump provides significantly higher power for L-band operation than the 980 nm pump and is less expensive to manufacture than the 980 nm pump.

Figure 7:
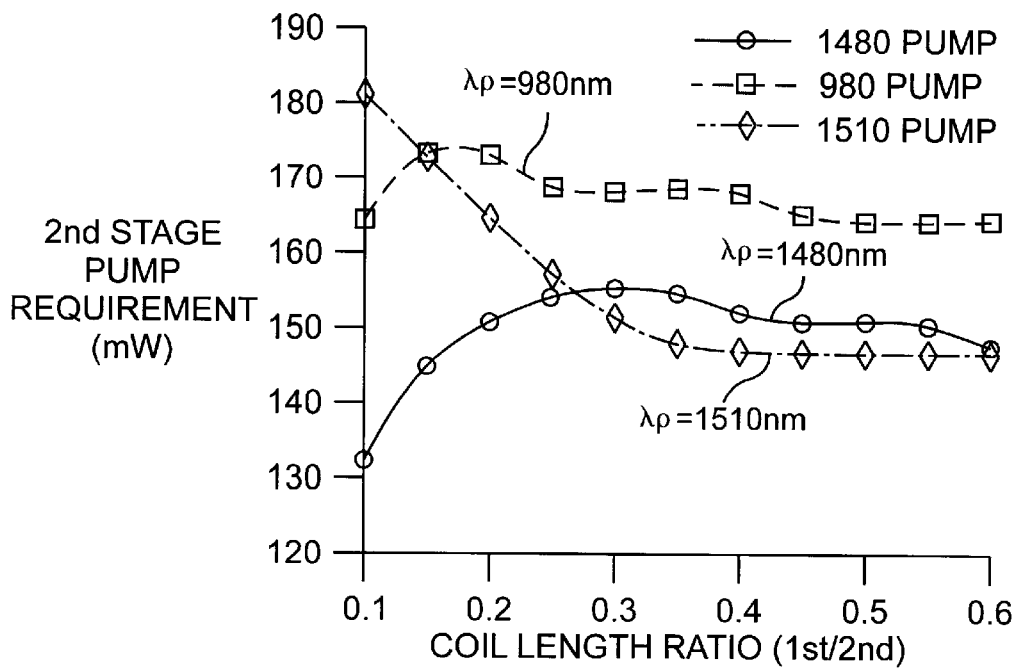
FIG. 7 illustrates second stage power requirements as a function of coil length ratio.

FIG. 7 illustrates the second stage pump power requirement as a function of coil length ratio between the first stage and second stages, when the first pump 20a operates at either 980 nm, 1480 nm, or 1510 nm wavelengths. The vertical axis represents pump power of the pump 20b in milliwats (mW). FIG. 7 illustrates that there is a reduction of pump power requirement (at coil ratios of about 0.16 or higher) when pumping at 1480 nm and 1510 nm compared to 980 nm pumping. Such reduction in pump power requirement will provide better pump margin for amplifier operation.

Figure 8:
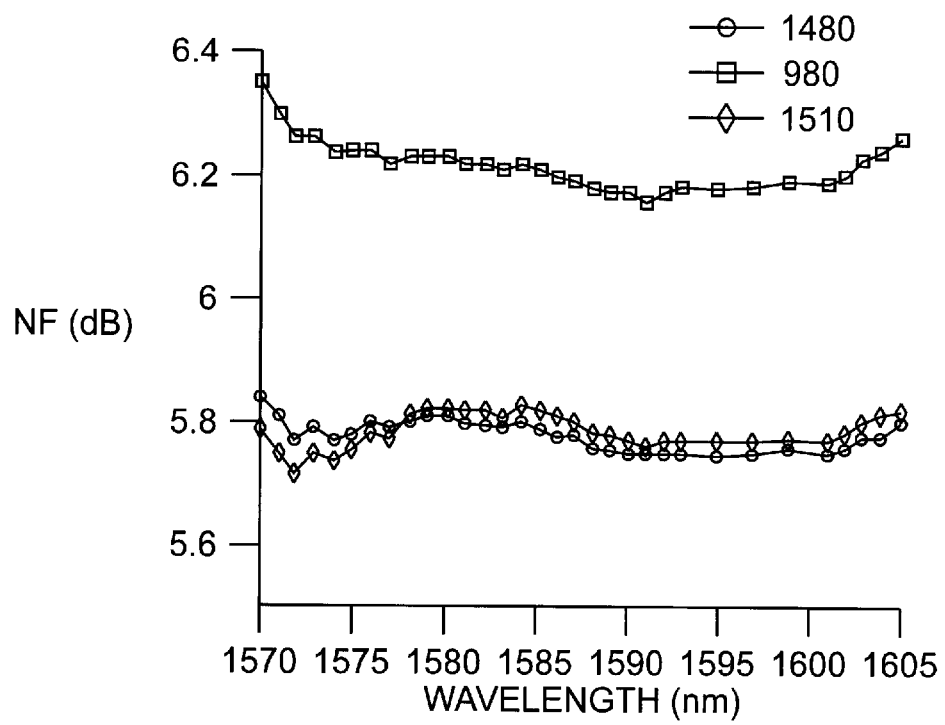
FIG. 8 is a family of curves representing predicted NF spectra as a function of pump wavelength.
Figure 10:
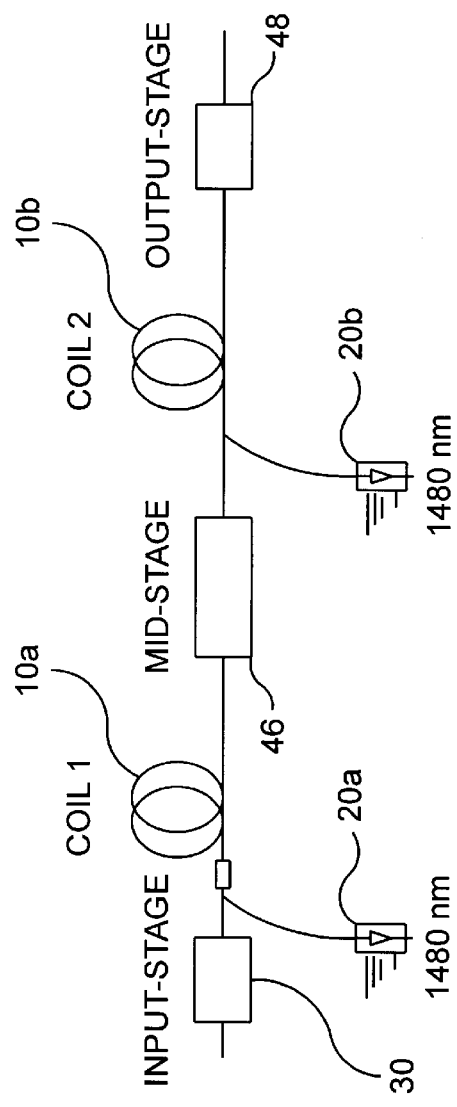
FIG. 10 is a schematic diagram illustrating a second exemplary optical amplifier.

FIG. 8 shows the NF spectrum (NF as a function of wavelength) from the above simulation. This NF spectrum is for the optimized coil ratio for each pumping configuration. The optimized coil ratio is about 0.3 and is determined by the ratio that results in the lowest noise figure (NF) for a given pump wavelength. FIG. 10 illustrates that pumping with the wavelengths of 980 nm and 1480 nm produce an equivalent noise figure performance, while a 1510 nm pumping configuration results in worse NF spectra for the L-band optical amplifiers.

Figure 9:
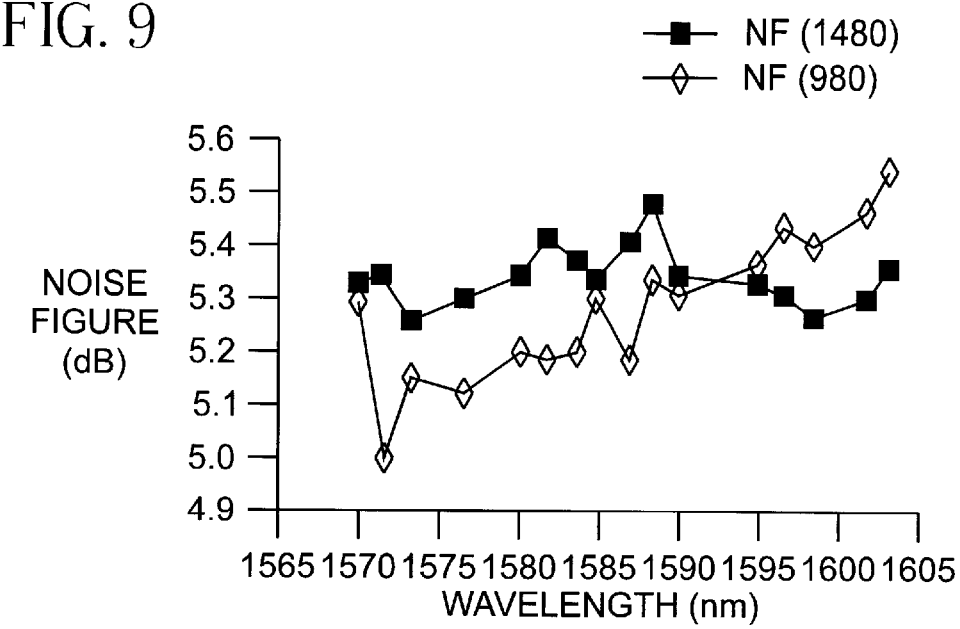
FIG. 9 is a family of curves representing experimental data of the NF spectra as a function of pump wavelength.

Experimental results on the NF spectra for the two stage EDFA that utilizes a 1480 nm first pump 20a and for the similar EDFA that utilizes a conventional 980 nm first pump 20a are shown in FIG. 9. The results are obtained from the same optical amplifier utilizing first a 980 nm first stage pump 20a and then utilizing a 1480 nm first stage pump 20a. The first stage pumps 20a operated at a fixed coil ratio of 40%. As expected, an all 1480 nm pumping configuration shows very good NF performance as compared to pumping configuration that utilizes a 980 nm first stage pump. This is consistent with the results from the simulation. With this configuration (the pump 20a providing laser beam at 1480 nm wavelength) we have observed a reduction of the total pump power by about 35%.

Based on the experimental and theoretical results, we determined that dual pumping the EDFA utilizing 1480 nm pump for each stage of the EDFA resulted in improved pumping efficiency, while maintaining low noise level. More specifically, we demonstrated that 1480 nm pump provides sufficient front-end inversion to keep equivalent noise figure performance. Because of the higher power conversion efficiency, 1480 nm first stage pump 20a lowers the pump margin by more than 10%. From a product point of view, such superior optical performance plus more than 40% cost advantage makes an all 1480 nm pumping configuration preferable in many application that utilize L-band EDFAs.

FIG. 10 illustrates another exemplary optical amplifier. This optical amplifier is similar to the amplifier in FIG. 4, but utilizes only one (forward pumping) 1480 nm pump 20b, coupled to the second EDF coil of the waveguide 10b.

In order to further reduce the NF in an L-band optical amplifier of the type shown in FIGS. 4 and 10, BASE needs to be removed or further minimized in order to avoid saturation of the inversion at the front end of the amplifier. This is done by placing an isolator between the first two gain stages of the amplifier, preferably in combination with forward 1480 nm pump in the first stage of the amplifier. Furthermore, as described below, the length of the fiber constituting the first gain stage was significantly reduced.

Figure 11:
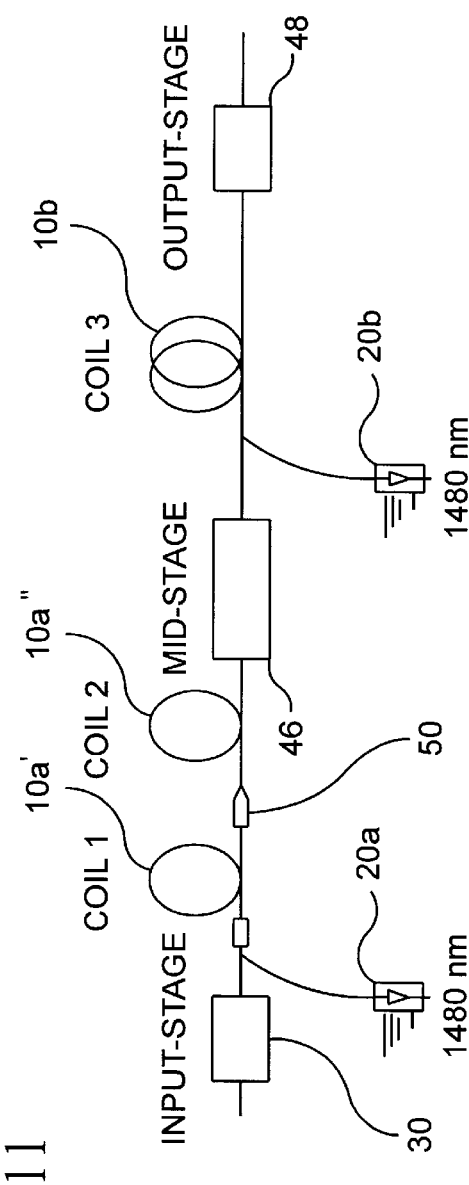
FIG. 11 is a schematic diagram illustrating a third exemplary optical amplifier.

FIG. 11 illustrates a third example of an L-band amplifier. This amplifier is similar to the amplifier of FIG. 10, but includes three gain stages (three amplification coils). More specifically, the active fiber of the first optical waveguide 10a of the amplifier of FIG. 10 has been split to form two sets of coiled fiber, thereby forming waveguides 10a' and 10a". In addition, the amplifier 5 of FIG. 11 includes an isolator 50 located between the waveguides 10a' and 10a". This isolator 50 blocks BASE, passes 1480 nm pump light and significantly reduces MPI (multipath interference), which is another critical factor in amplifier performance.

Figure 12:
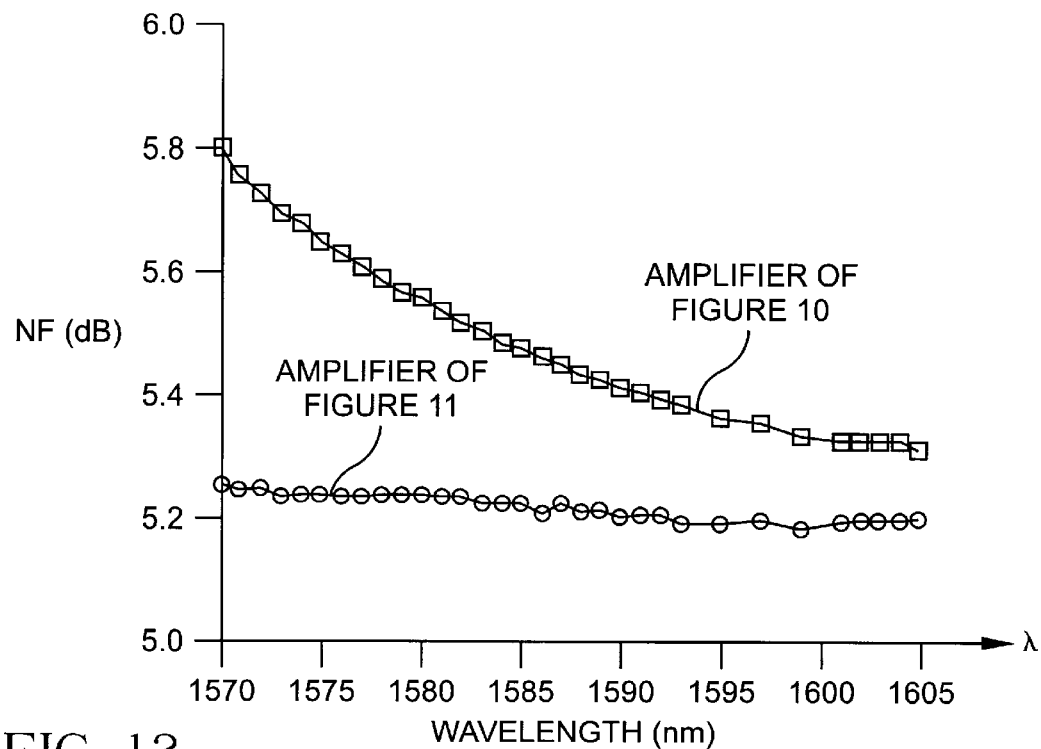
FIG. 12 is a simulated noise figure NF as a function of wavelength $\lambda$.
Figure 13:
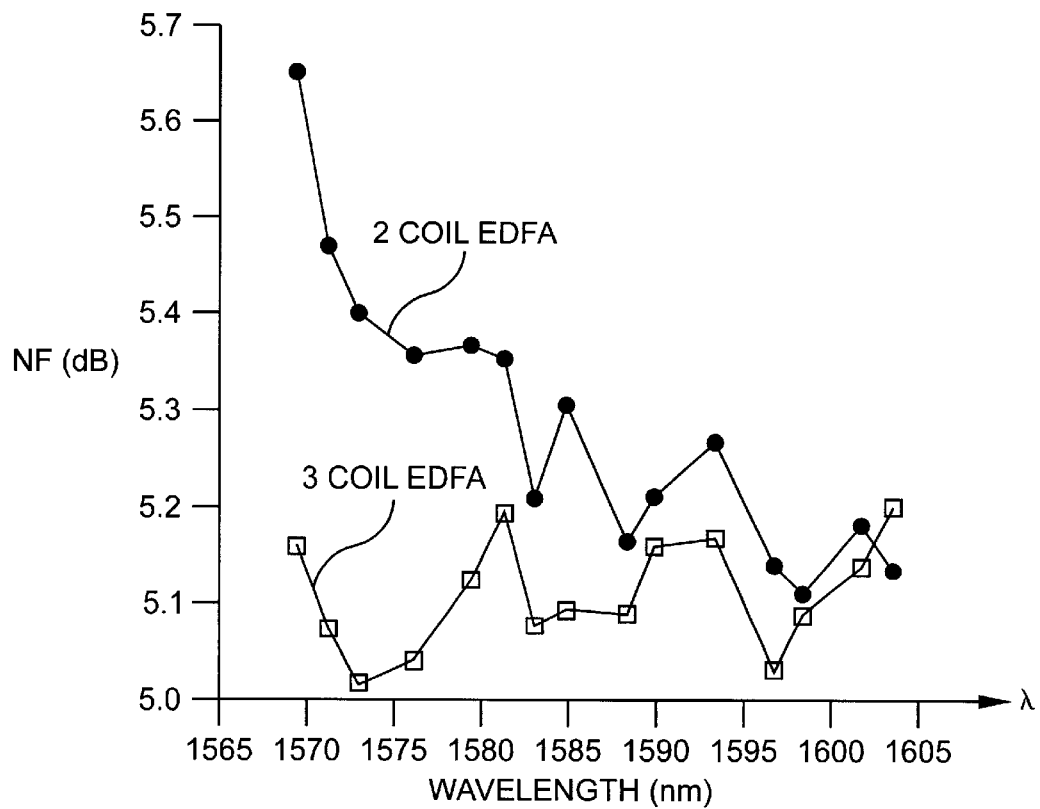
FIG. 13 illustrates noise figure NF as a function of wavelength $\lambda$.

FIG. 12 shows the simulated noise figure NF as a function of the wavelength λ for the amplifiers illustrated in FIGS. 10 and 11. It is clear from the simulation that the amplifier of FIG. 11 has a dramatically reduced NF (by as much as 0.5 dB) when compared to the amplifier of FIG. 10. To verify the results of the simulation, an experiment is performed using the two-coil and three-coil amplifiers similar to those of FIGS. 10 and 11. The result is shown in FIG. 13. This figure also indicates that the use of a shorter fiber in the first coil of active fiber and the use of an isolator in conjunction with the forward pumping first pump improves NF by as much as 0.5 dB.

Figure 14:
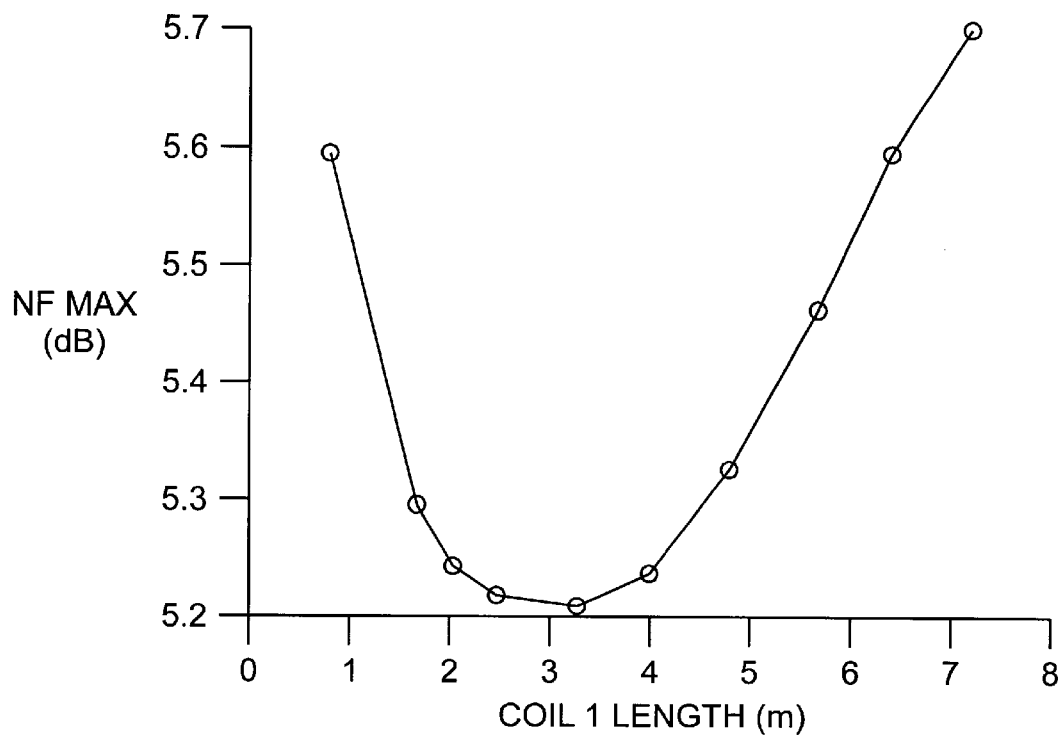
FIG. 14 illustrates simulated sensitivity of noise figure NF as a function of first coil length.

The length of the active fiber forming the first stage (i.e., the fiber coil of the waveguide 10a') was then varied and the impact of the length of the fiber on the NF as observed. The active fiber used in this and other examples has high Er concentration of about 2000 ppm and has a peak absorption (non exited fiber) of 20 dB/m at λ=1530 nm. FIG. 14 illustrates simulated sensitivity of maximum NF for the amplifier of FIG. 11 as a function of the length of the active fiber that forms the first coil of this amplifier. FIG. 14 shows that there is an optimum fiber length when the amplifier achieves the lowest NF performance, which is about 3 meters in this amplifier. This coil provides 8 dB gain at the wavelength of 1570 nm. This figure also illustrates that the stability of the NF to the change of fiber length is very good. There is a tolerance of about ±1 m in the length of the active fiber forming the wave guide 10a' that results in low NF. Thus, the length of the active fiber forming the coil of the waveguides 10a' of the amplifier shown in FIG. 11 is very short. It is about 3 meters.

The length of the active fiber forming the coil of the waveguide 10a" is significantly longer—about 10 meters.

The novel L-band EDFA amplifier of FIG. 11 also exhibits much lower MPI (multipath interference) than that of the amplifier of FIG. 10. MPI is an additional noise to ASE. MPI accumulates along the fiber optic system with multiple amplification nodes. As stated above, the length of the first coil of the amplifier of FIG. 11 is significantly reduced (from more than 10 meters to around 2 meters) when compared with that of the amplifier of FIG. 10. As a result, the MPI is reduced by about 20 dB, which is a tremendous relaxation of the system budget. To achieve such system performance with previous design, an isolator has to be used at the front end of the amplifier, which degrades amplifier NF by an additional amount of about 0.5 dB. Thus, the improved L-band amplifier of FIG. 11 provides an improvement in NF of about 1.0 dB when compared with the amplifier of FIG. 10. In addition, the amplifier of FIG. 11, when compared with the amplifier of FIG. 10, has the BASE reduced by approximately 15 dB. This will help improve system performance significantly as well.

It is noted that if a different active fiber is used (i.e. a fiber with different absorption capability) the optimum length of the first coil may change. However, the optimum length of the first coil can be easily determined when NF is plotted as a function of the length of the first coil. Generally, this optimum length is determined by the absorption coefficient of the active fiber. For example, if the absorption coefficient of a new fiber is smaller than in the fiber used in the above examples, the optimum coil length for the first coil will be increased to achieve the same BASE power.

Five more exemplary L-band amplifiers with low NF are shown in FIGS. 15A–15E. These amplifiers utilize one or more of the features of the amplifier depicted in FIG. 11. Depending on the power requirement of EDFA, two coils and three coils can be implemented using different numbers of pumps (1480 nm) for the best NF and power performance.

Figure 15A:
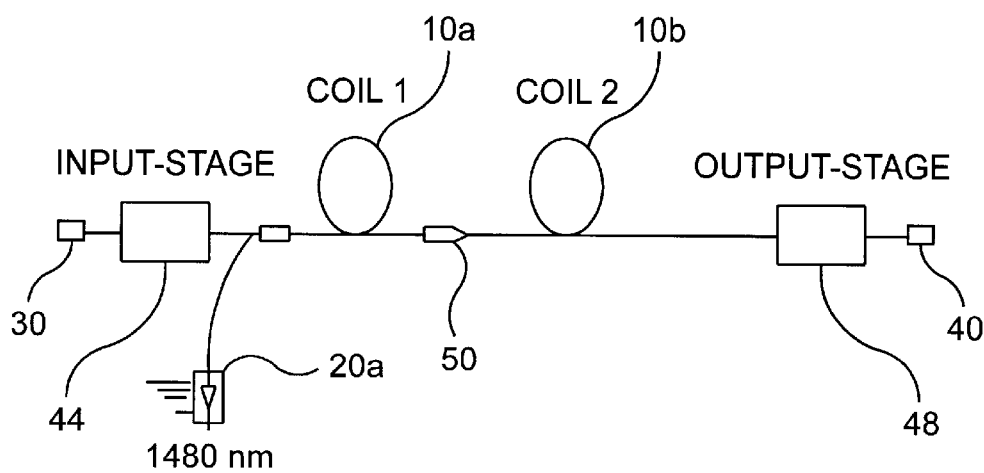
FIGS. 15A–15E are a schematic diagrams illustrating additional exemplary optical fiber amplifiers.

More specifically, FIG. 15A illustrates a two stage L-band EDFA (Erbium doped fiber amplifier) with a low NF. This amplifier operates at a relatively low power level. The preferred length of the EDF coil corresponding to the waveguide 10a is about 3 meters. This first EDF coil is forward pumped with a 1480 nm pump 20a. The preferred length of the EDF coil corresponding to the waveguide 10b is about 8–25 meters. An isolator 50 is located between the two waveguides 10a and 10b.

Figure 15B:
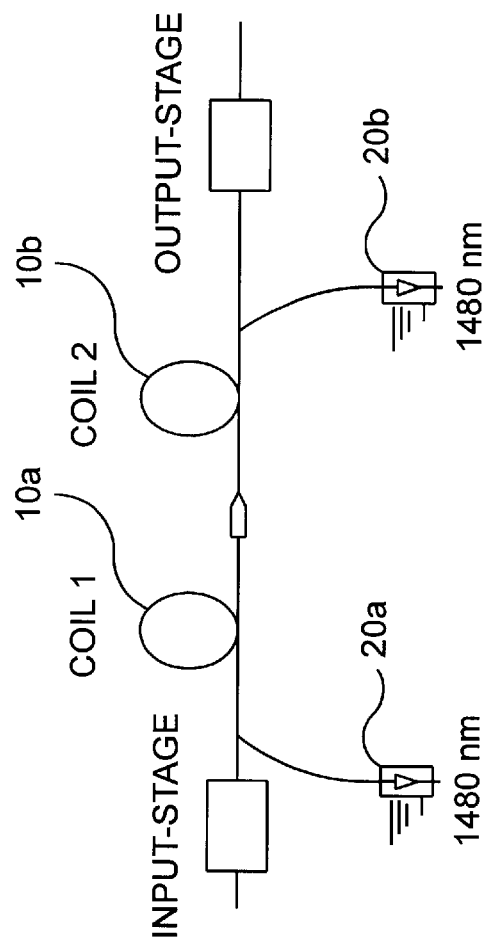
Figure 15C:
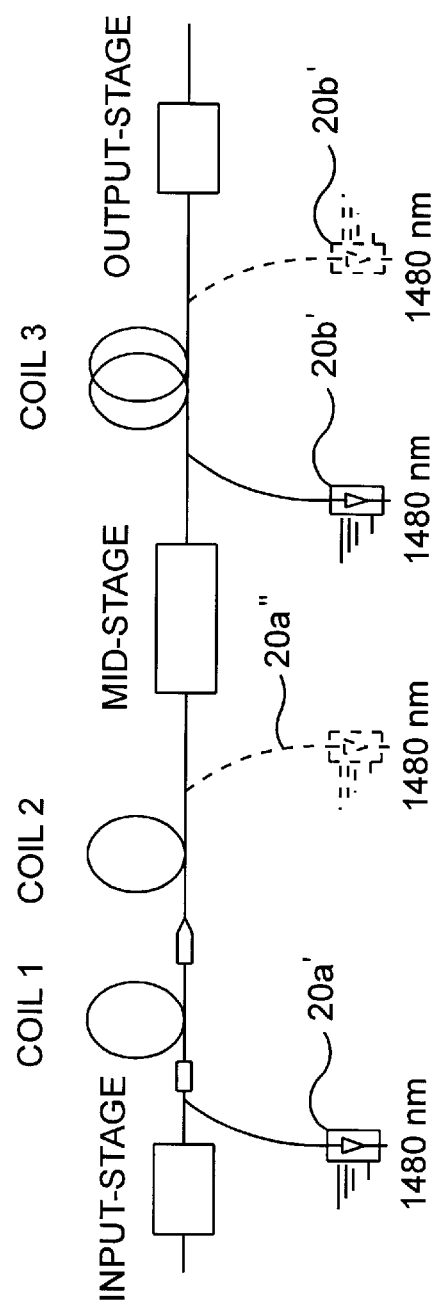
Figure 15D:
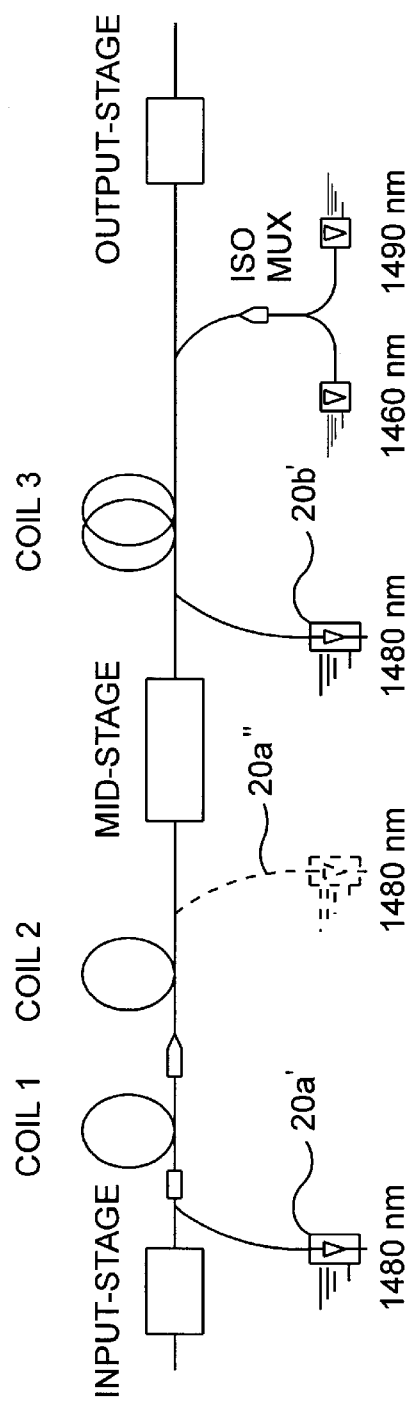

The amplifier depicted in FIG. 15B is similar to the amplifier of FIG. 15A. However, the amplifier of FIG. 15B utilizes a backward pumping 1480 nm pump 20b that is coupled to the waveguide 10b. The first stage of this amplifier (corresponding to the waveguide 10a has an Erbium doped coil which is about 3 meters long. The amplifier depicted in FIG. 15C is similar to the amplifier of FIG. 11 but it utilizes two additional 1480 nm backward pumping pumps 20a' and 20b. The amplifier depicted in FIG. 15D is similar to the amplifier of FIG. 15C but it utilizes several different pumps 20b. The pumps 20b of this EDFA operate at different wavelengths, for pump multiplexing.

Figure 15E:
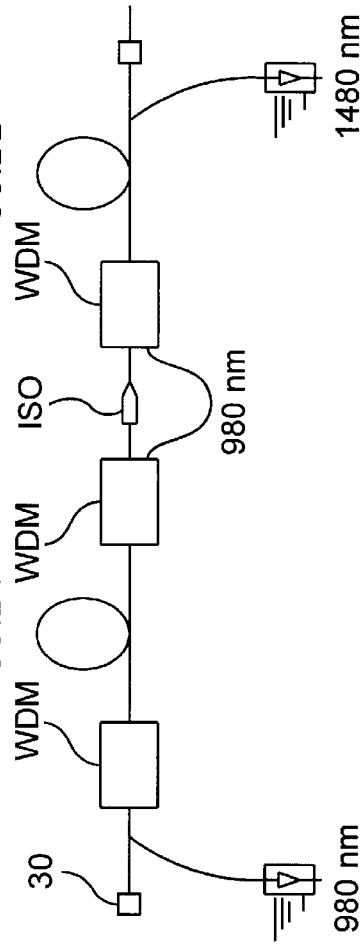

The amplifier depicted in FIG. 15E is similar to the amplifier of FIG. 15B. However, the amplifier of FIG. 15E utilizes a forward pumping 980 nm pump 20a and backward pumping 1480 nm pump 20b. The first stage of this amplifier (corresponding to the waveguide 10a) has an Erbium doped coil which is about 3 meters long. The second Erbium doped coil (corresponding to the waveguide 10b) is about 20 meters long. An isolator 50 is located between the two coils. A wave division multiplexer 52 couples the 980 nm pump to the first waveguide 10a. A second wave division multiplexer (WDM) 54 is located between the two waveguides 10a and 10b. The multiplexer 54 separates the 980 nm pump light exiting the first waveguide from the signal carrying light. The signal carrying light passes through the isolator 50 and enters the waveguide 10b. The 980 nm light exiting the WDM 54 is routed around the isolator 50 and is multiplexed, with a WDM 56, to the waveguide 10b.

Accordingly, it will be apparent to those skilled in the art that various modifications and adaptations can be made to the present invention without departing from the spirit and scope of this invention. It is intended that the present invention cover the modifications and adaptations of this invention as defined by the appended claims and their equivalents.

What is claimed is:

1. An optical amplifier comprising:
   (i) a first gain medium having an optical host that contains a rare earth dopant, said first gain medium being an optical fiber of a predetermined length, such that inversion of said first gain medium is not saturated,
   (ii) a first pump that supplies optical energy at a first wavelength into said first gain medium;
   (iii) a second gain medium operatively coupled to said first gain medium; and (iv) a second pump, said second pump supplying optical energy into said second gain medium, wherein said predetermined length is 1 to 6 meters.

2. The optical amplifier according to claim 1, wherein wherein said optical amplifier further includes an isolator located between said first gain medium and an adjacent gain medium, and wherein said first pump is a forward pumping pump.

3. The optical amplifier according to claim 1, wherein said predetermined length is 1.5 to 4.5 meters.

4. The optical amplifier according to claim 1, wherein said predetermined length is such that said inversion of said first gain medium is 0.7 to 0.9 of full inversion value due to a given pump wavelength.

5. The optical amplifier according to claim 1, wherein said predetermined length is such that said front end inversion of said first gain medium is not saturated by 0.1 to 0.3 of inversion level.

6. The optical amplifier according to claim 1, wherein said first pump is a 1480 nm pump.

7. The optical amplifier according to claim 1, wherein first pump is 980 nm pump.

8. The optical amplifier of claim 1, wherein said optical fiber is an Erbium doped glass fiber.

9. The optical amplifier of claim 1, further including an isolator located between said first gain medium and said second gain medium.

10. An optical amplifier comprising:
   (i) A first gain medium having an optical host that contains a rare earth dopant, said first gain medium being an Er doped optical fiber having a length of less than 10 meters,
   (ii) a 1480 nm first pump that supplies optical energy at a first wavelength into said first gain medium;
   (iii) a second gain medium operatively coupled to said first gain medium, said second gain medium being an Er doped optical fiber having a length of greater than 10 meters; and
   (iv) a second pump said second pump supplying optical energy into said second gain medium.

11. An optical amplifier according tot claim 10, wherein said first pump is a forward pumping pump.

12. An optical amplifier according to claim 11, wherein said second pump is a 1480 nm pump.

13. An optical amplifier according to claim 10, wherein said second pump is a 1480 nm pump.

14. An optical amplifier comprising:
   (i) a first gain medium having an optical host that contains a rare earth dopant, said first gain medium being a coiled Er doped optical fiber with no more that 25 dB of absorption when unexcited,
   (ii) a first pump that supplies optical energy at a first wavelength into said first gain medium;
   (iii) a second gain medium operatively coupled to said first gain medium; and
   (iv) a second pump, said second pump supplying optical energy into said second gain medium.

15. An optical amplifier according to claim 14, further including an isolator located between said first and said second gain medium.

16. An optical amplifier according to claim 14, wherein said first pump is a forward pumping 1480 nm pump.

17. An optical amplifier according to claim 14, wherein said second pump is a 1480 nm pump.

18. The optical amplifier according to claim 14, further including at least one additional gain medium.

19. The optical amplifier according to claim 10 or 14, further containing a mid stage situated intermediate said first and said second gain medium, said mid stage delivering an output signal from said first gain medium into said second gain medium, wherein said mid stage includes at least one of the following components: an isolator, a filter, a gain flattener, or an attenuator.

20. The optical amplifier according to claim 10, further comprising at least one additional pump.

21. The optical amplifier according to claim 20, wherein said additional pump operates at a wavelength that is different from the wavelengths of said first and said second pumps.

22. The optical amplifier according to claim 10, further including at least one additional gain medium.

* * * * *